(12) United States Patent
Rovaart et al.

(10) Patent No.: US 7,966,689 B2
(45) Date of Patent: Jun. 28, 2011

(54) WIPER BLADE LATCHING DEVICE

(75) Inventors: Robert-Jan Rovaart, Buehl-Neusatz (DE); Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 937 days.

(21) Appl. No.: 11/866,527

(22) Filed: Oct. 3, 2007

(65) Prior Publication Data
US 2008/0083082 A1   Apr. 10, 2008

(30) Foreign Application Priority Data

Oct. 4, 2006  (DE) .......................... 10 2006 046 908

(51) Int. Cl.
*B60S 1/40* (2006.01)
(52) U.S. Cl. ................. 15/250.32; 15/250.351; 403/154; 403/157; 403/161
(58) Field of Classification Search ............... 15/250.32, 15/250.351, 250.46, 250.44, 250.43; 403/154, 403/157, 161
See application file for complete search history.

(56) References Cited

U.S. PATENT DOCUMENTS

| 4,261,074 | A | * | 4/1981 | Bauer et al. | 15/250.32 |
| 4,324,019 | A | * | 4/1982 | Mohnach et al. | 15/250.32 |
| 4,649,591 | A | * | 3/1987 | Guerard | 15/250.32 |
| 5,903,953 | A | * | 5/1999 | Dimur et al. | 15/250.04 |
| 6,591,445 | B2 | * | 7/2003 | Nacamuli | 15/250.32 |

FOREIGN PATENT DOCUMENTS

| GB | 2163042 | * | 2/1986 |
| WO | 02/34592 A1 | | 5/2002 |
| WO | 2005/000647 | * | 1/2005 |

* cited by examiner

*Primary Examiner* — Gary K Graham
(74) *Attorney, Agent, or Firm* — Michael Best & Friedrich LLP

(57) ABSTRACT

The invention relates to a wiper blade latching device, for coupling a wiper blade (10) to a wiper arm (12), having at least one wiper unit (14) which has at least one latching means (16, 18), which can be deflected counter to a tensioning force, and at least one guide means (20, 22). It is proposed that the latching means (16, 18) is at least partially decoupled from the guide means (20, 22).

18 Claims, 2 Drawing Sheets

WIPER BLADE LATCHING DEVICE

BACKGROUND OF THE INVENTION

The invention relates to a wiper blade latching device.

WO 02/34592 A1 discloses a wiper blade latching device for coupling a wiper blade to a wiper arm. The wiper blade latching device comprises a wiper unit which is fixedly connected to the wiper arm and which has web-like latching means. The latching means have, integrally formed on their free ends, guide means which are formed by inclined faces and which are moveably coupled to the latching means.

SUMMARY OF THE INVENTION

The invention relates to a wiper blade latching device, for coupling a wiper blade to a wiper arm, having at least one wiper unit which has at least one latching means, which can be deflected counter to a tensioning force, and at least one guide means.

It is proposed that the latching means is at least partially decoupled from the guide means. Here, "decoupled" is to be understood to mean in particular that the latching means and the guide means are formed by different components and/or from different materials, and/or particularly advantageously that, during a latching process, the latching means can be deflected at least substantially independently from the guide means. A "guide means" is to be understood to mean in particular a means which leads a means, which is provided for correspondence with the latching means, at least in the direction of a receiving region which is delimited by the latching means. The clamping force is preferably formed by an elastic force of a spring element which can advantageously be formed in one piece with the latching means and/or can also be formed by an additional component. It is however fundamentally possible for the clamping force to be formed by other forces which would appear to be expedient to a person skilled in the art, such as in particular by a magnet force etc.

By means of a corresponding embodiment, the latching means can be of particularly short and robust design, and it is nevertheless possible by means of the guide means to obtain an advantageously large guide region and resulting simple and comfortable assembly.

It is additionally possible by means of the guide means to obtain advantageous protection of the latching means, specifically in particular if the guide means is arranged in front of the latching means in an insertion direction of a fastening means which, during the assembly of the wiper blade, corresponds with the latching means, and preferably shields a partial region of the latching means such that the fastening means which corresponds with the latching means can be placed in contact with said latching means only in intended regions of the latter. It is possible in particular to prevent the latching means, proceeding from its initial position during the assembly of the wiper blade, from being deflected in an incorrect direction, and damaged, by a pressing force of the corresponding fastening means. The guide means can therefore additionally form an advantageous protective means which is provided for protecting the latching means.

If a recess which forms a free movement space of the latching means is arranged between the latching means and the guide means, it is possible to obtain a particularly compact design, specifically in particular if the recess which forms the free movement space is formed in the manner of a slot. Here, a "free movement space" is to be understood to mean in particular a space into which the latching means are deflected during a latching process. In addition, a "slot-like recess" is to be understood to mean in particular a recess which has a length which is a multiple larger than the width, specifically the length is preferably at least three times as large as the width, and particularly advantageously at least four times as large as the width.

In a further embodiment, it is proposed that the wiper unit has a recess which forms an insertion region, as a result of which the wiper blade latching device is realized in a structurally simple manner and, in addition, simple assembly can be obtained, specifically in particular if the recess which forms the insertion region is formed so as to taper in an insertion direction of a fastening means which, during the assembly of the wiper blade, corresponds with the latching means. Here, the recess can be designed in a stepped fashion and/or advantageously so as to taper continuously at least in one region, such as in particular by means of guide faces which are aligned obliquely with respect to the insertion direction.

The recess which forms the insertion region can be delimited by various functional means which would appear to be expedient to a person skilled in the art, but particularly advantageously by the latching means and by the guide means, as a result of which a compact construction can be obtained, specifically in particular if the recess which forms the free movement space opens out into the recess which forms the insertion region.

It is also proposed that at least the latching means is formed at least partially from plastic, as a result of which said latching means can be formed so as to be structurally simple, light and cost-effective.

If the latching means and the guide means are formed in one piece, it is possible to save on additional components, assembly expenditure and costs.

The wiper unit can form a part of the wiper blade and/or advantageously a part of the wiper arm, or can, in the still-uncoupled state of the wiper blade with the wiper arm, be fixedly connected to the wiper blade and/or advantageously fixedly connected to the wiper arm. If the wiper unit forms a part of the wiper arm, it is advantageously possible for said wiper unit to be utilized multiple times for a plurality of wiper blades.

BRIEF DESCRIPTION OF THE DRAWINGS

Further advantages can be gathered from the following description of the drawing. The drawing illustrates an exemplary embodiment of the invention. The drawing, the description and the claims contain numerous features in combination. A person skilled in the art will also expediently consider the features individually and combine them to form further expedient combinations.

In the drawing.

DETAILED DESCRIPTION

Figure 1:
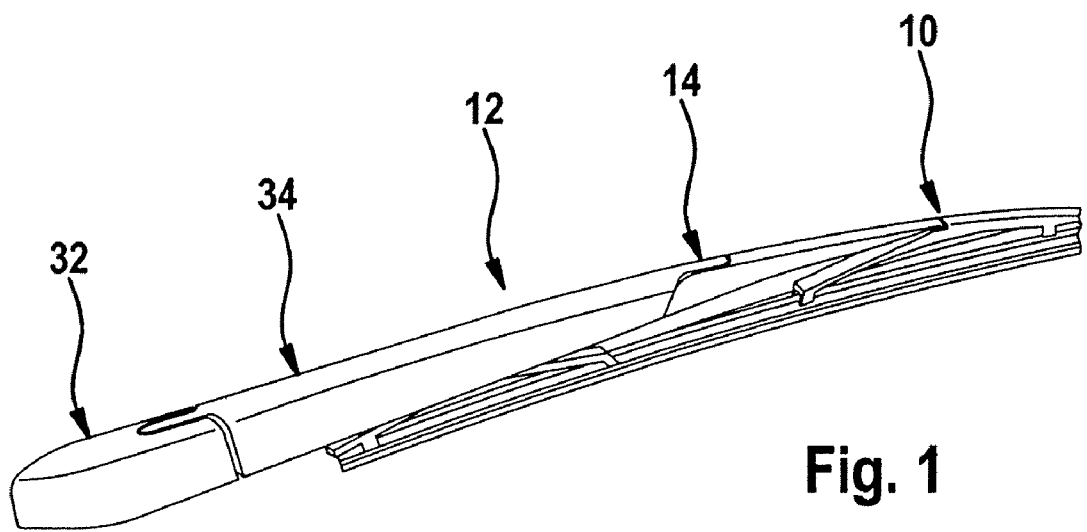
FIG. 1 shows a wiper having a wiper arm and a wiper blade which is fastened to the wiper arm.
Figure 2:
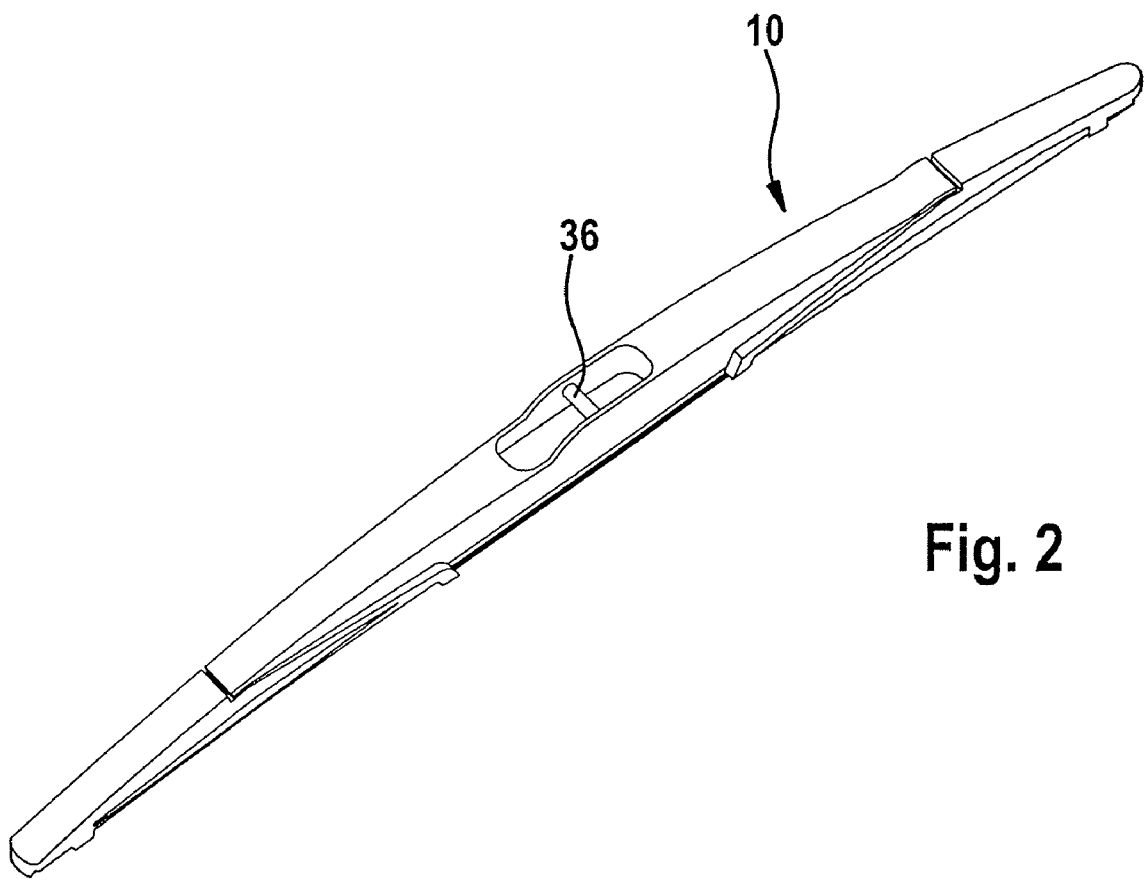
FIG. 2 shows the wiper blade from FIG. 1 individually.
Figure 3:
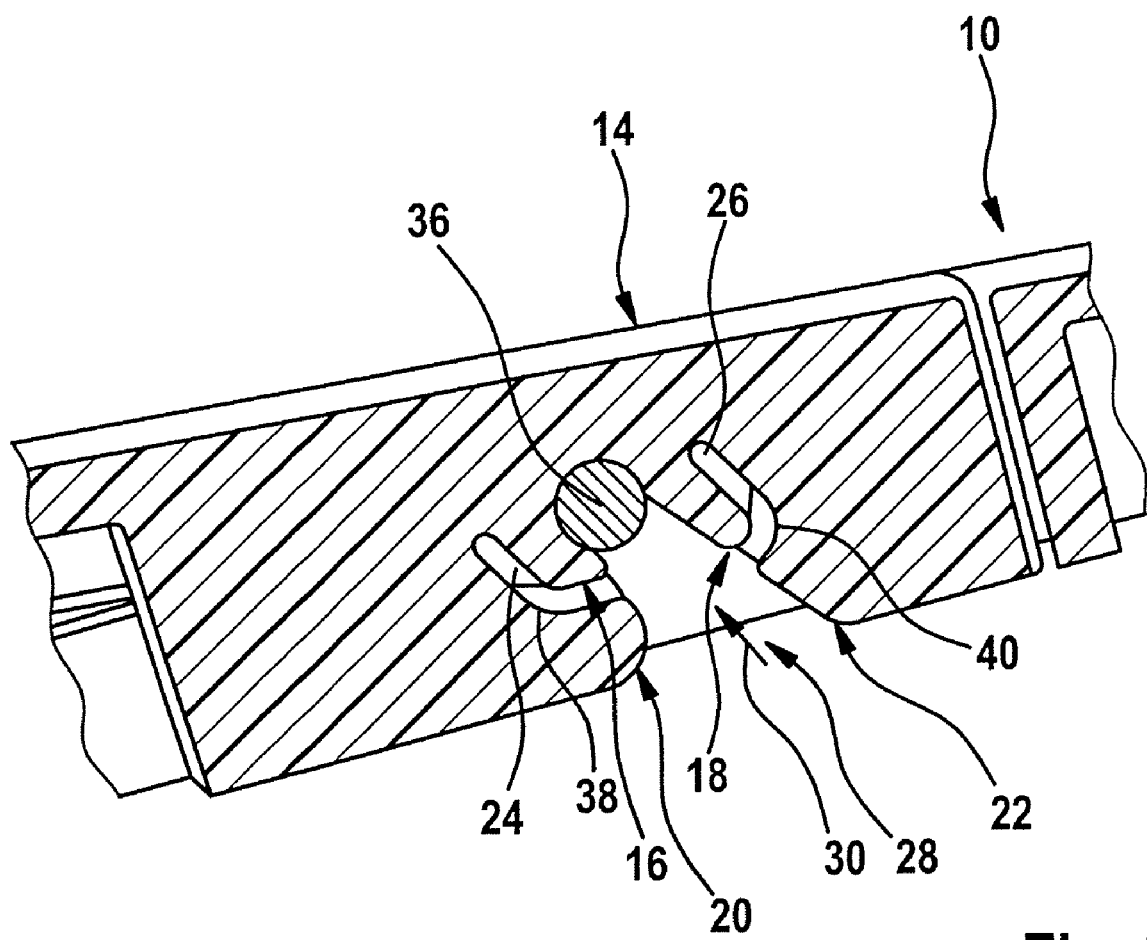
FIG. 3 shows a section through a wiper blade latching device of the wiper when the wiper blade from FIG. 1 is assembled.

FIG. 1 shows a wiper having a wiper arm 12 which comprises a fastening part 32, for fastening the wiper arm 12 to a wiper shaft (not illustrated in any more detail), and an articulated arm 34 which is articulatedly connected to the fastening part 32. The articulated arm 34 is produced from plastic and, at its free end, has a wiper blade latching device for coupling a wiper blade 10 to the wiper arm 12 (FIGS. 1, 2 and 3). The wiper blade latching device comprises a wiper unit 14 which is formed in one piece with the articulated arm 34 and which is formed at the free end of the articulated arm 34 by a narrowed partial region.

The wiper unit 14 has two latching means 16, 18 which are integrally formed in one piece and which can be deflected counter to an elastic clamping force when a fastening means 36, which is formed by a bolt, of the wiper blade 10 is latched between the latching means 16, 18. In addition, the wiper unit 14 has two guide means 20, 22 which are integrally formed in one piece, with the latching means 16, 18 being decoupled from the guide means 20, 22, that is to say the latching means 16, 18 can be deflected independently from the guide means 20, 22 when the fastening means 36 of the wiper blade 10 is latched in between the latching means 16, 18.

In each case one slot-like recess 24, 26, which forms a free movement space of the latching means 16, 18, is arranged between the latching means 16, 18 and the guide means 20, 22. Proceeding from their initial position, the latching means 16, 18 are deflected into the free movement spaces when the latching means 36 is latched in.

The latching means 16, 18 and the guide means 20, 22 delimit a recess 28, which forms an insertion region, of the wiper unit 14, which recess 28 is formed so as to taper continuously in an insertion direction 30 in which the fastening means 36 of the wiper blade 10 are inserted during the fastening thereof. For this purpose, the guide means 20, 22 and the latching means 16, 18 have corresponding inclined faces. The guide means 20, 22 are arranged in each case in front of the latching means 16, 18 in the insertion direction 30 and shield a partial region of the latching means 16, 18, so that the fastening means 36 can be placed in contact with the latching means 16, 18 only in intended regions of the latter.

The recesses 24, 26 which form the free movement spaces have substantially the same width over their length and extend, proceeding from an upper side of the articulated arm 34, in each case substantially parallel to the insertion direction 30 in a first region, have angled portions 38, 40, which adjoin the first regions, in the direction of the recess 28 which forms the insertion region, and finally open out into the recess 28 which forms the insertion region.

If, during the assembly of the wiper blade 10 on the wiper arm 12, the fastening means 36 are inserted in the insertion direction 30 into the recess 28 which forms the insertion region, the fastening means 36 is initially guided by the guide means 20, 22. By means of the guide means 20, 22 which form a tapering partial region of the insertion region, the fastening means 36 is guided in a targeted fashion in the direction of a receiving region which is delimited by the latching means 16, 18, whereby it is possible to prevent the fastening means 36 from undesirably coming into contact with the latching means 16, 18 and possibly damaging the latter as a result. During a continued insertion movement in the insertion direction 30, the fastening means 36 is guided between the latching means 16, 18 which, as a result, are deflected elastically outwards, that is to say into the free movement spaces. Once the fastening means 36 has passed through a narrowed partial region which is delimited by the latching means 16, 18, the latching means 16, 18 latch in behind the fastening means 36 and secure the latter in the receiving region between the latching means 16, 18.

The invention claimed is:

1. Wiper blade latching device, for coupling a wiper blade (10) to a wiper arm (12), the device having at least one wiper unit (14) which has latching means (16, 18), which can be deflected counter to a tensioning force, the latching means (16, 18) engaging and latching to a fastening means (36), and guide means (20, 22) guiding along the fastening means (36), the guide means and the latching means cooperating to define a recess (28) for receiving the fastening means (36), the recess (28) defined by opposite walls tapering from the guide means (20, 22) into and substantially aligned with respective, opposite walls tapering into the latching means (16, 18), characterized in that the latching means (16, 18) is at least partially decoupled from the guide means (20, 22) by a pair of slots extending from the recess (28) between respective opposite walls of the guide means (20, 22) and the latching means (16, 18).

2. Wiper blade latching device according to claim 1, characterized in that the guide means (20, 22) is arranged in front of the latching means (16, 18) in an insertion direction (30) of the fastening means (36) which, during the assembly of the wiper blade (10), corresponds with the latching means (16, 18).

3. Wiper blade latching device according to claim 1, characterized in that the recess (28) forms an insertion region.

4. Wiper blade latching device according to claim 3, characterized in that the recess (28) which forms the insertion region is formed so as to taper in an insertion direction (30) of the fastening means (36) which, during the assembly of the wiper blade (10), corresponds with the latching means (16, 18).

5. Wiper blade latching device according to claim 1, characterized in that at least the latching means (16, 18) is formed at least partially from plastic.

6. Wiper blade latching device according to claim 1, characterized in that the latching means (16, 18) and the guide means (20, 22) are formed in one piece.

7. Wiper blade latching device according to claim 1, characterized in that the wiper unit (14) forms a part of the wiper arm (12).

8. Wiper blade latching device according to claim 1, characterized in that each slot has an open end between the associated latching means (16, 18) and guide means (20, 22) and a closed end, the slot having a substantially constant width from the open end to the closed end.

9. Wiper blade latching device according to claim 8, characterized in that each slot has a length from the open end to the closed end, and in that the length is at least three times greater than the width of the slot.

10. Wiper blade latching device according to claim 1, characterized in that each slot forms a free movement space of the associated latching means (16, 18).

11. Wiper blade latching device according to claim 1, characterized in that each slot has a first slot portion generally parallel to an insertion direction into the recess (28) and a second slot portion communicating between the recess (28) and the first slot portion, the second slot portion being angled with respect to the insertion direction and with respect to the first slot portion.

12. Wiper arm having a wiper blade latching device, for coupling a wiper blade (10) to the wiper arm, the device having at least one wiper unit (14) which has latching means (16, 18), which can be deflected counter to a tensioning force, the latching means (16, 18) engaging and latching to a fastening means (36), and guide means (20, 22) guiding along the fastening means (36), the guide means and the latching means cooperating to define a recess (28) for receiving the fastening means (36), the recess (28) defined by opposite walls tapering from the guide means (20, 22) into and substantially aligned with respective, opposite walls tapering into the latching means (16, 18), characterized in that the latching means (16, 18) is at least partially decoupled from the guide means (20, 22) by a pair of slots extending from the recess (28) between respective opposite walls of the guide means (20, 22) and the latching means (16, 18).

13. Wiper arm according to claim 12, characterized in that the guide means (20, 22) is arranged in front of the latching means (16, 18) in an insertion direction (30) of the fastening means (36) which, during the assembly of the wiper blade (10), corresponds with the latching means (16, 18).

14. Wiper arm according to claim 12, characterized in that the recess (28) forms an insertion region.

15. Wiper arm according to claim 12, characterized in that each slot has an open end between the associated latching means (16, 18) and guide means (20, 22) and a closed end, the slot having a substantially constant width from the open end to the closed end.

16. Wiper arm according to claim 15, characterized in that each slot has a length from the open end to the closed end, and in that the length is at least three times greater than the width of the slot.

17. Wiper arm according to claim 12, characterized in that each slot forms a free movement space of the associated latching means (16, 18).

18. Wiper arm according to claim 12, characterized in that each slot has a first slot portion generally parallel to an insertion direction into the recess (28) and a second slot portion communicating between the recess (28) and the first slot portion, the second slot portion being angled with respect to the insertion direction and with respect to the first slot portion.

* * * * *